E. P. TALCOTT.
Steam Wagon.
No. 100,086.                      Patented Feb. 22, 1870.
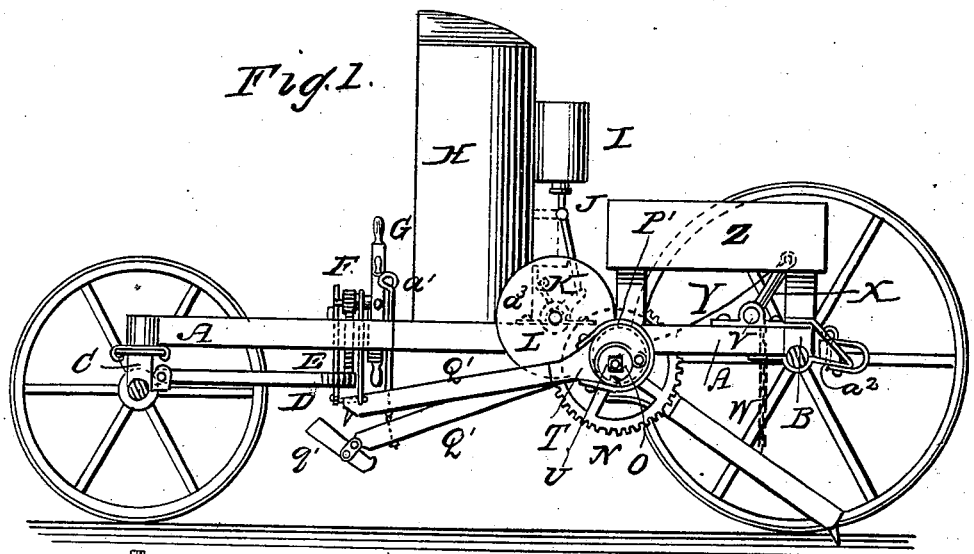
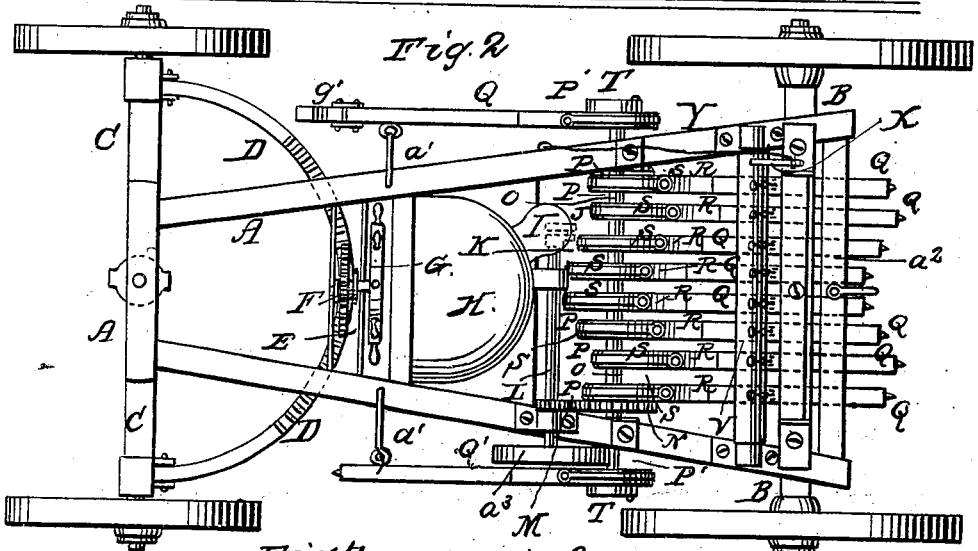
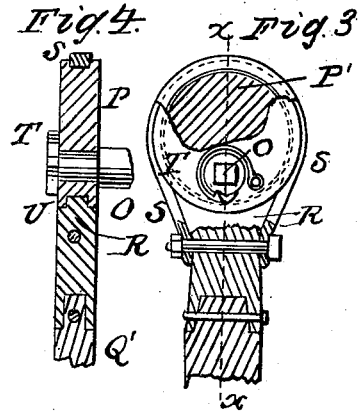
WITNESSES
INVENTOR

United States Patent Office.

E. P. TALCOTT, OF BLAIR, NEBRASKA.

Letters Patent No. 100,086, dated February 22, 1870.

IMPROVEMENT IN STEAM-WAGONS.

The Schedule referred to in these Letters Patent and making part of the same.

*To all whom it may concern:*

Be it known that I, E. P. TALCOTT, of Blair, in the county of Washington, and State of Nebraska, have invented a new and useful Improvement in Steam-Wagons; and I do hereby declare that the following is a full, clear, and exact description thereof, which will enable others skilled in the art to make and use the same, reference being had to the accompanying drawing forming part of this specification, in which—

Figure 1 is a side view of my improved steam-wagon.

Figure 2 is a top view of the same, the tender being removed.

Figure 3 is a detail side view of one of the reversed cams, part being broken away to show the construction.

Figure 4 is a detail sectional view of the same, taken through the line $x\ x$, fig. 3.

Similar letters of reference indicate corresponding parts.

My invention has for its object to furnish an improved steam-wagon, which shall be so constructed and arranged that it may be conveniently used for drawing a gang of plows, or for drawing any other desired loads through fields or upon common roads; and It consists in the construction and combination of various parts of the machine, as hereinafter more fully described.

A is the frame of the wagon, the rear part of which is securely attached to the rear axle B, and the forward end of which is connected with the forward axle C by a king-bolt.

To the forward axle C is attached a semicircular rack, D, into the teeth of which mesh the teeth of the gear-wheel E, the teeth of which mesh into the teeth of the small gear-wheel F, to one end of the shaft of which is attached a hand-wheel, G, so that the wagon may be conveniently guided as desired.

H is the boiler, which is secured to the frame A, and with which is connected the engine I, the piston-rod J of which is connected with the crank K of the driving-shaft L.

The driving-shaft L revolves in bearings attached to the frame A, and to it is attached a small gear-wheel, M, the teeth of which mesh into the teeth of the larger gear-wheel N, attached to the shaft O.

The shaft O revolves in bearings attached to the frame A, and to it is attached a series of cams, P, with which are connected a series of legs or feet, Q, the lower ends of which rest upon the ground, and are pointed or shod to enable them to take a firmer hold upon the ground.

To the upper end of the legs Q are attached semicircular sockets R, which fit upon the cams P, and are held in contact with said cams P by the bands or straps S, the ends of which are attached to the said sockets, and which pass around the said cams.

The cams P are arranged in pairs, one of each pair being upon each side of the center of the shaft O, so that the legs Q may work in pairs, and thus propel the wagon squarely forward.

Upon the outer ends of the shaft O are placed two cams P', which are connected with the said shaft by spring-pawls T and ratchet-wheels U, so that when the machine is moving forward the said cam P' may ride upon the said shaft; but when the motion of the shaft O is reversed, the said shaft may carry the said cams with it, operating the side legs Q' and backing the machine.

The side legs Q' have shoes $q'$ or spikes attached to their lower ends, and when not required for use are hung from arms $a'$ attached to the frame A.

V is a roller, the journals of which revolve in bearings attached to the frame A, and which is connected with the legs Q by the chains W, so that when the roller V is revolved, the chains W may be wound around it, raising the legs Q away from the ground, and allowing the machine to be backed or turned.

The roller V may be revolved to raise the legs Q by means of a lever, X, or wheel attached to it, and provided with a draw-rope, rod, or lever, Y, extending forward into such a position that it may be conveniently reached and operated by the attendant when required.

Z is a tender or wood and water reservoir, which rests upon and is secured to supports attached to the rear part of the frame A.

$a^2$ is a bar securely attached to the rear end of the frame A, for convenience in attaching the object to be drawn.

$a^3$ is a pulley attached to the end of the drive-shaft L, to enable the engine to be used for driving stationary machinery.

Having thus described my invention,

I claim as new, and desire to secure by Letters Patent—

1. The arrangement of mechanism for propelling the wagon from the piston-rod J, in the manner described.

2. The combination of spring-pawls T and ratchet-wheels $u$ with cams P' arranged on the ends of shaft O to operate the legs Q', at the times and in the manner described.

3. An improved steam-wagon, constructed, arranged, and operating substantially as herein shown and described, and for the purpose set forth.

E. P. TALCOTT.

Witnesses:
A. B. HERMAN,
J. B. HERMAN.